(12) United States Patent
Cleveland

(10) Patent No.: US 8,009,001 B1
(45) Date of Patent: Aug. 30, 2011

(54) HYPER HALBACH PERMANENT MAGNET ARRAYS

(75) Inventor: Mark A Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 12/537,211

(22) Filed: Aug. 6, 2009

Related U.S. Application Data

(63) Continuation-in-part of application No. 11/678,772, filed on Feb. 26, 2007, now Pat. No. 7,598,646.

(51) Int. Cl.
*H01F 7/06* (2006.01)
*H02K 1/28* (2006.01)

(52) U.S. Cl. .............. 335/306; 310/156.31; 310/156.43

(58) Field of Classification Search .... 310/12.05–12.09, 310/12.14, 12.21, 12.23, 12.24, 12.25, 12.29, 310/17, 156.31, 156.43; 335/179, 212, 229, 335/234, 296, 304, 306, 308
See application file for complete search history.

(56) References Cited

U.S. PATENT DOCUMENTS

| | | | | |
|---|---|---|---|---|
| 4,862,128 | A | * | 8/1989 | Leupold ................. 335/306 |
| 5,383,049 | A | * | 1/1995 | Carr ..................... 359/283 |
| 5,420,556 | A | * | 5/1995 | Okazaki ................. 335/212 |
| 5,631,618 | A | * | 5/1997 | Trumper et al. ........... 335/299 |
| 5,705,902 | A | | 1/1998 | Merritt et al. |
| 6,188,147 | B1 | * | 2/2001 | Hazelton et al. .......... 310/12.06 |
| 6,278,216 | B1 | | 8/2001 | Li |
| 6,316,849 | B1 | * | 11/2001 | Konkola et al. .......... 310/12.06 |
| 6,841,910 | B2 | | 1/2005 | Gery |
| 6,858,962 | B2 | | 2/2005 | Post |
| 6,876,284 | B2 | | 4/2005 | Wright et al. |
| 6,914,351 | B2 | | 7/2005 | Chertok |
| 6,983,701 | B2 | | 1/2006 | Thornton et al. |
| 7,031,116 | B2 | | 4/2006 | Subrahmanyan |
| 7,053,508 | B2 | | 5/2006 | Kusase et al. |
| 7,078,838 | B2 | | 7/2006 | Post |
| 7,265,470 | B1 | * | 9/2007 | Paden et al. ............. 310/156.43 |
| 7,368,838 | B2 | | 5/2008 | Binnard et al. |
| 7,462,968 | B2 | | 12/2008 | Kusase et al. |
| 2008/0224557 | A1 | | 9/2008 | Cleveland |

OTHER PUBLICATIONS

"Inductrack Passive Magnetic Levitation", http://www.skytran.net/press/sciam02.htm, 2003.
"Halback array", http://en.wikipedia.org/wik/Halbach_array, Wikipedia, the free encyclopedia, Nov. 7, 2006.
Mallinson, J.C., "One-Sided Fluxes—A Magnetic Curiosity?", IEEE Transaction on Magnetics, Dec. 1973, pp. 678-682, vol. MAG-9, No. 4.
Sandtner et al., "Electrodynamic Passive Magnetic Bearing With Planar Halbach Arrays", Ninth International Symposium on Magnetic Bearings, Aug. 3-6, 2004, 6 pages, Kentucky US.

\* cited by examiner

*Primary Examiner* — Tran Nguyen
(74) *Attorney, Agent, or Firm* — Haynes & Boone, LLP.

(57) ABSTRACT

Higher-order Halbach permanent magnet arrays that produce higher flux densities in the air gaps of electromotive machines are described. In one embodiment, a second order "Hyper" Halbach array includes a plurality of magnets arranged immediately adjacent to each other so as to define a rectangular matrix having rows and columns in which the respective magnetic fields of a first row of the array are arranged so as to define a conventional first order Halbach array, and, proceeding in a column direction of the array, the respective magnetic fields of the magnets of each of a second and succeeding rows of the array are respectively rotated counter-clockwise about an axis perpendicular to the column direction of the array through successive 90 degree rotations relative to those of the immediately preceding row.

20 Claims, 5 Drawing Sheets

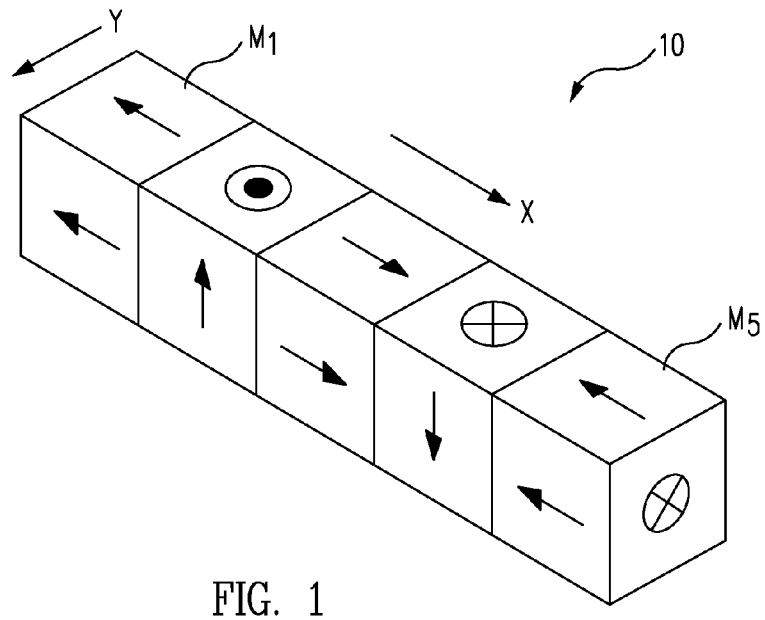
FIG. 1
(PRIOR ART)
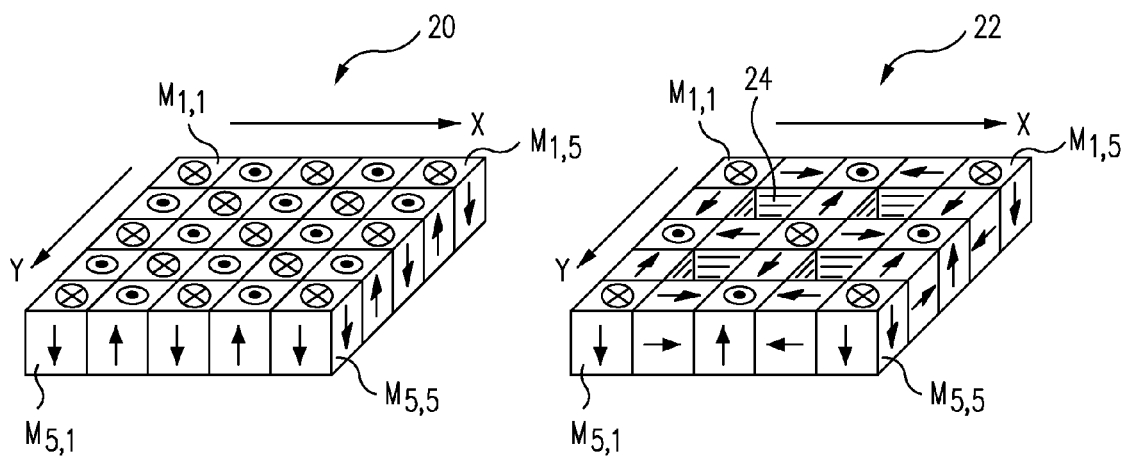
FIG. 2A
(PRIOR ART)
FIG. 2B
(PRIOR ART)

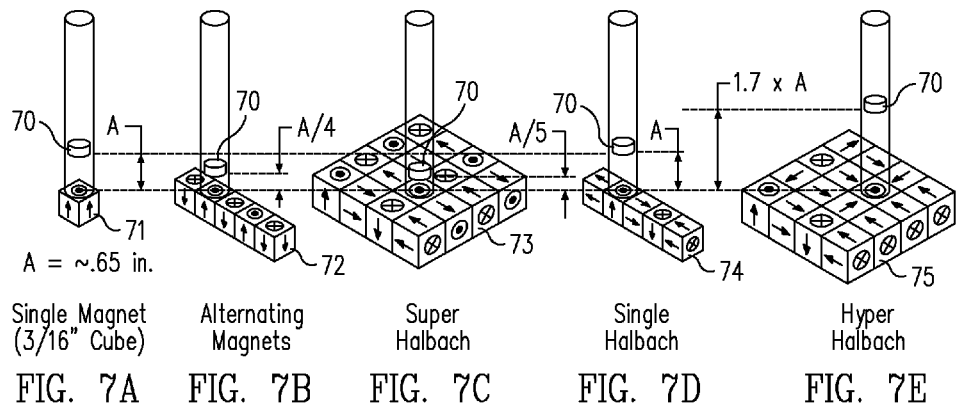
FIG. 7A  Single Magnet (3/16" Cube)
FIG. 7B  Alternating Magnets
FIG. 7C  Super Halbach
FIG. 7D  Single Halbach
FIG. 7E  Hyper Halbach
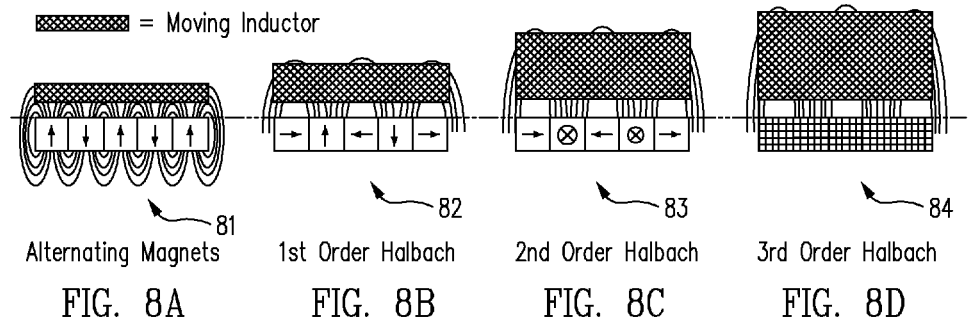
FIG. 8A  Alternating Magnets
FIG. 8B  1st Order Halbach
FIG. 8C  2nd Order Halbach
FIG. 8D  3rd Order Halbach
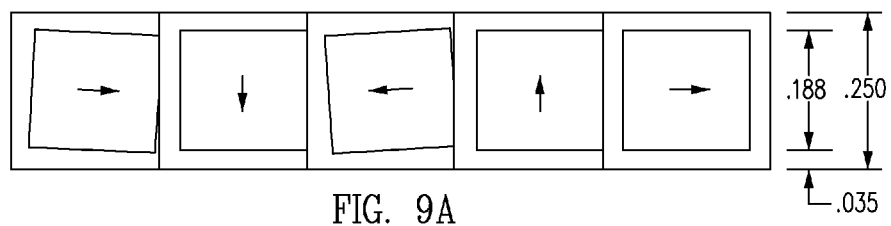
FIG. 9A
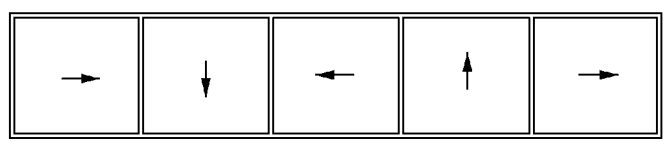
FIG. 9B

HYPER HALBACH PERMANENT MAGNET ARRAYS

RELATED APPLICATIONS

This application is a continuation in part (CIP) of U.S. Appl. Ser. No. 11/678,772, filed Feb. 26, 2007, now U.S. Pat. No. 7,598,646, issued Oct. 6, 2009, the entire disclosure of which is incorporated herein by reference.

BACKGROUND

1. Technical Field

This disclosure relates to magnetics in general, and in particular, to a method for arranging magnets in arrays to produce enhanced magnetic fields.

2. Related Art

"Halbach" magnet arrays have been widely used in permanent-magnet electrical machines since the mid 1980's to enhance performance and efficiency. The Halbach array has the property of producing a relatively high magnetic field on one side of the array while cancelling the field on the other side of the array to near zero.

As illustrated in FIG. 1, a Halbach array 10 is formed by successively rotating each of a linear row of magnets about an axis perpendicular to the long axis (the X axis) of the array such that the direction of their respective magnetic field vectors (as indicated by the arrows) is oriented 90 degrees relative to that of the immediately preceding magnet, from the first to the last magnet in the array. This produces an enhanced magnetic field on one side of the array 10 and substantially cancels the magnetic field on the opposite side (i.e., a "one-sided" magnetic flux).

In the above-referenced co-pending application, electrical motor/generators incorporating Halbach arrays and using both permanent and electro-magnets are disclosed that enable air gaps between the magnets and inductors of the devices to be increased without unduly increasing the weight of the devices. Other motor/generator applications incorporating Halbach arrays are described in the patent literature in, e.g., U.S. Pub. 2007/0029889 A1 by T. Dunn et al.; U.S. Pubs. 2003/0071532 A1 and 2003/0057791 A1 by R. Post; U.S. Pat. No. 7,352,096 to T. Dunn et al.; U.S. Pat. No. 7,291,953 to J. Smith et al.; and, U.S. Pat. No. 5,705,902 to B. Merritt et al.

Additionally, the ability of Halbach arrays to produce one-sided magnetic fluxes have resulted in their incorporation in a variety of so-called magnetic levitation or "maglev" track designs, as described in, e.g., U.S. Pat. Nos. 6,758,146; 6,664,880 and 6,633,217 to R. Post; and, U.S. Pat. No. 6,684,794 to O. Fiske et al.

Halbach arrays have also been advantageously incorporated in other electromotive devices to improve their performance, e.g., in passive magnetic bearings (U.S. Pat. No. 6,344,344 to R. Post), horizontal positioning devices (U.S. Pat. No. 6,531,793 to P. Frissen et al and U.S. Pat. No. 6,441,514 to D. Markle) and hydraulic pumps (U.S. Pat. No. 6,846,168 to W. Davis et al.)

Given their wide range of advantageous application to such a wide variety of electromotive devices, a need exists for improved Halbach arrays, including higher order Halbach arrays, that can yield even greater magnetic flux densities in such devices.

SUMMARY

In accordance with the present disclosure, higher-order Halbach arrays are provided that can be used to augment permanent-magnet-type electromotive machines, such as motor/generators and other magnetically driven devices so as to provide simpler, less expensive ways for producing higher flux densities in the air gaps of such machines.

In one example embodiment, a second order Hyper Halbach array of magnets comprises a plurality of magnets arranged immediately adjacent to each other so as to define a rectangular matrix having rows and columns, in which the respective magnetic fields of a first row of the array are arranged so as to define a conventional first order Halbach array and, proceeding in a column direction of the array, the respective magnetic fields of the magnets of each of a second and succeeding rows of the array are respectively rotated counter-clockwise about an axis perpendicular to the column direction of the array through successive 90 degree rotations relative to those of the immediately preceding row.

A better understanding of the above and many other features and advantages of the novel higher order Halbach magnet arrays of the present disclosure may be obtained from a consideration of the detailed description of some example embodiments thereof presented below, particularly if such description is taken in conjunction with the appended drawings, wherein like reference numerals are used to identify like elements illustrated in one or more of the figures thereof.

BRIEF DESCRIPTION OF THE DRAWINGS

FIG. 1 is a perspective view of an example embodiment of a first order Halbach array in accordance with the prior art;

FIGS. 2A and 2B are perspective views of a second order "opposite" or "alternating" array of magnets and a second order "Halbach 2D" array, respectively, in accordance with the prior art;

FIGS. 7A-7E are perspective views of an ordinary disk magnet being levitated above respective ones of a single magnet, an array of magnets with alternating fields, a second order Super Halbach array, a conventional first order Halbach array, and a second order Hyper Halbach array, by means of the opposing fields respectively acting therebetween;

FIGS. 8A-8D are end elevation views respectively illustrating the respective heights, relative to a moving inductor, of the respective magnetic fields above a first order array of magnets with alternating fields, a conventional first order Halbach array, a second order Super Halbach array, and a third order Hyper Halbach array;

FIGS. 9A and 9B are end views respectively illustrating the actual positions assumed by the respective end magnets of a Hyper Halbach array when installed in the fluted retainer of FIG. 4 as a result of the attractive/repulsive magnetic forces acting therebetween, and the ideal positions that the magnets would assume if no opposing forces were acting therebetween; and, FIG. 10 is a graph of the relative surface fields of the respective magnetic fields of a single magnet, a conventional first order Halbach array, and a second order Hyper Halbach array, respectively, as a function of the height of an air gap above them.

DETAILED DESCRIPTION

Figure 3:
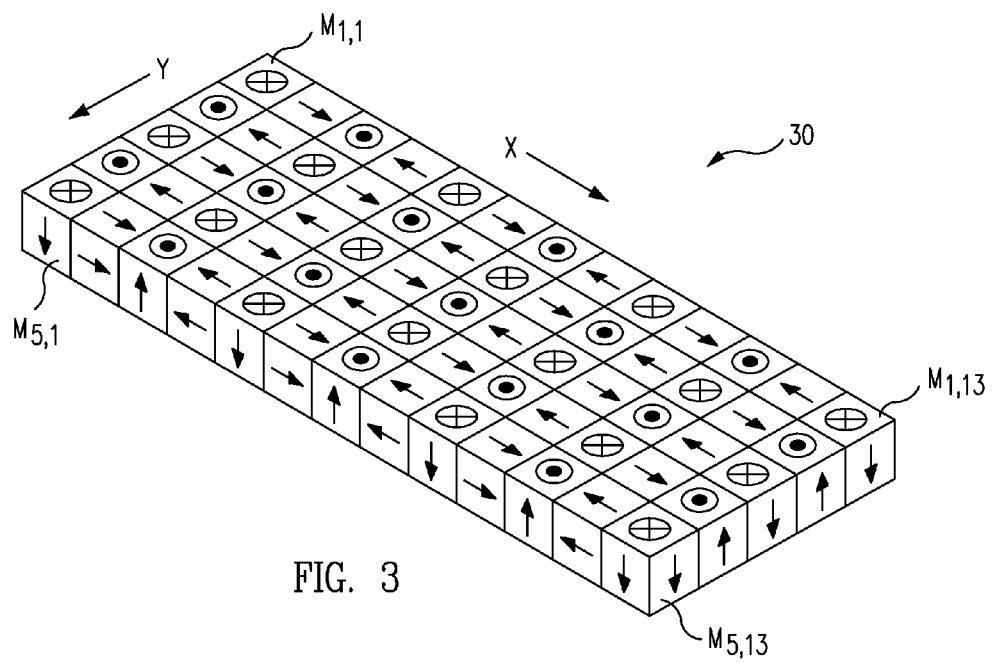
FIG. 3 is a perspective view of an example embodiment of a second order Halbach array in accordance with the present disclosure, referred to herein as a second order "Super Halbach" array.

The novel Halbach arrays disclosed herein can be used to augment permanent-magnet-type electromotive machines, such as motors, generators and other magnetically driven devices. They can provide a simple, inexpensive way for producing higher magnetic flux densities in the air gaps of such machines, or alternatively, larger air gaps for a given magnetic flux density.

As illustrated in the perspective view of FIG. 1, a conventional Halbach array 10 consists of a plurality of magnets $M_1$-$M_5$, which may be either permanent or electro-magnets, which are arranged in a linear row in such a way as to cause the magnetic field on one side of the array to be substantially enhanced, and the field on the opposite side of the array to be substantially cancelled. In the particular 1×5 Halbach array 10 of FIG. 1, the magnets $M_i$ are small, cubic or rectangular permanent magnets, e.g., neodymium-ferrite-boron (NdFeB) or "rare-earth" magnets, having respective north facing magnetic fields with directions indicated in the figure by vector arrows "←", "↑", "→" and "↓", and having heads "⊙" and tails "⊗", in which the respective field of each magnet $M_i$ is successively rotated 90 degrees about an axis parallel to a Y axis shown and perpendicular to the long axis (the X axis) of the array relative to the immediately preceding magnet, throughout the entire row, i.e., from the first, or "kernel" magnet $M_1$, to the last magnet $M_n$.

Thus, in the particular 1×5 Halbach array 10 illustrated in FIG. 1, the first or kernel magnet $M_1$ of the array is arranged such that its magnetic field extends in the negative X direction, the second such that its field extends up, the third such that its field extends in the positive X direction, and so on, until at $M_5$ of the array, the field arrangement pattern begins to repeat. In the conventional Halbach array 10 of FIG. 1, the magnetic field extending below the lower face of the array 10 is substantially enhanced, relative to a single one of the magnets while that extending above the upper face of the array is substantially cancelled, due to the application of the Hilbert transform to the π/2, or 90 degree, phase harmonic of the array, as explained by J. C. Mallinson in One-Sided Fluxes—A Magnetic Curiosity, IEEE Transactions On Magnetics, vol. Mag-9, No. 4, December 1973. The conventional Halbach array 10 of FIG. 1 is defined herein as a "one-dimensional," a "single" or a "first order" Halbach array.

Two-dimensional or "second order" arrays of permanent magnets are also known in the art. FIGS. 2A and 2B are perspective views of a second order "opposite" or "alternating" array 20, and a second order "Halbach 2D" array 22, respectively, as described by H. Bleuler et al. in *Passive Magnetic Bearings for Flywheels*, (http://www.silphenix.ch/bleuler_sandner_vortrag.pdf). The 5×5 "alternating" array 20 of FIG. 2A is composed of rows (extending in the X direction) and columns (extending in the Y direction) of magnets $M_{i,j}$ in which the respective fields of the magnets $M_{i,j}$ alternate in direction, i.e., are disposed 180 degrees out of phase with each other, whereas, the 5×5 "Halbach 2D" array 20 of FIG. 2B is configured with rows (extending in the X direction) of single order Halbach arrays of magnets $M_{i,j}$, each similar to the 1×5 first order Halbach array 10 of FIG. 1, and columns (extending in the Y direction) in which single order Halbach arrays similar to those of the rows alternate with "partially populated" columns, i.e., columns containing alternating gaps 24 of magnets $M_{i,j}$, with fields that alternate 180 degrees in direction.

It may be noted that in both of the example second order prior art 5×5 arrays 20 and 22 of FIGS. 2A and 2B, the respective fields of the magnets $M_{i,j}$ in the rows (extending in the X direction) are rotated either 180 degrees (alternating) or 90 degrees (Halbach) about an axis perpendicular to the corresponding row axis (extending in the X direction) of the respective arrays relative to the preceding magnet in the row, and the respective fields of the magnets $M_{i,j}$ in the columns (Y direction) are rotated either 180 degrees (alternating) or 90 degrees (Halbach) about an axis perpendicular to the corresponding column axis relative to the preceding magnet in the column.

As between the two conventional second order arrays of FIGS. 2A and 2B, the "Halbach-2D" configuration of FIG. 2B is said to the more efficient because it concentrates the magnetic field on only one side of the array 22 while using a reduced number of magnets $M_{i,j}$ (since the array is not completely populated with magnets), and additionally, produces a greater magnetic field. However, the "alternating 2D" array 20 configuration of FIG. 2A, which is made of neighboring magnets $M_{i,j}$ with opposite polarities, is almost as effective, and has the additional advantage of being easy to assemble into the matrix form of the array 20, since adjacent magnets $M_{i,j}$ will "stick" or adhere together, due to the mutually attractive forces acting between them, without any bonding or gluing, as opposed to their behavior in the "Halbach-2D" array 22 of FIG. 2B, in which, as discussed in more detail below, opposing forces acting between adjacent magnets $M_{i,j}$ will cause them to spin apart from each other, unless they are bonded together or otherwise constrained in their respective places in the matrix by a retaining device.

FIG. 3 is a perspective view of an example embodiment of a second order Halbach array 30 in accordance with the present disclosure, referred to herein as a "Super Halbach" array. As may be seen in FIG. 3, the example 5×13 second order Super Halbach array 30 has row/column magnet $M_{i,j}$ arrangements similar to both the second order arrays 20 and 22 of FIGS. 2A and 2B, but with the following differences. In the example second order Super Halbach array 30 of FIG. 3, each of the respective rows (extending in the X direction) of magnets $M_{i,j}$ comprise first order Halbach arrays, similar to the conventional first order Halbach array 10 of FIG. 1, and as in the second order Halbach 2D array 22 of FIG. 2B, while each of the respective columns (extending in the Y direction) comprise magnets $M_{i,j}$ with fields that alternate in direction, i.e., that are disposed 180 degrees out of phase with each other. As may be seen in FIG. 3, the Super Halbach array 30 can be constructed, or "built up" in the X or row direction, by taking a first or "kernel" column of alternating magnets $M_{i,j}$, i.e., column $M_{1,1}$-$M_{1,5}$ in FIG. 3, and then, proceeding in the X or row direction, repeating that column, but with each succeeding column respectively rotated counter-clockwise about an axis perpendicular to the row or X direction through successive 90 degree rotations relative to the immediately preceding column, to the last column $M_{1,m}$-$M_{n,m}$, or in the particular embodiment illustrated in FIG. 3, from column $M_{1,1}$-$M_{5,1}$ to column $M_{1,13}$-$M_{5,13}$.

The example 5×13 second order Super Halbach array 30 illustrated in FIG. 3 exhibits the one-sided flux phenomenon of the single order Halbach array 10 of FIG. 1 and an enhanced field strength comparable to that of the conventional Halbach-2D array 22 of FIG. 2B. However, it has been discovered that an even greater flux strength can be obtained in a second order array by a reconfiguration of the pattern of the magnets $M_{i,j}$.

Figure 4:
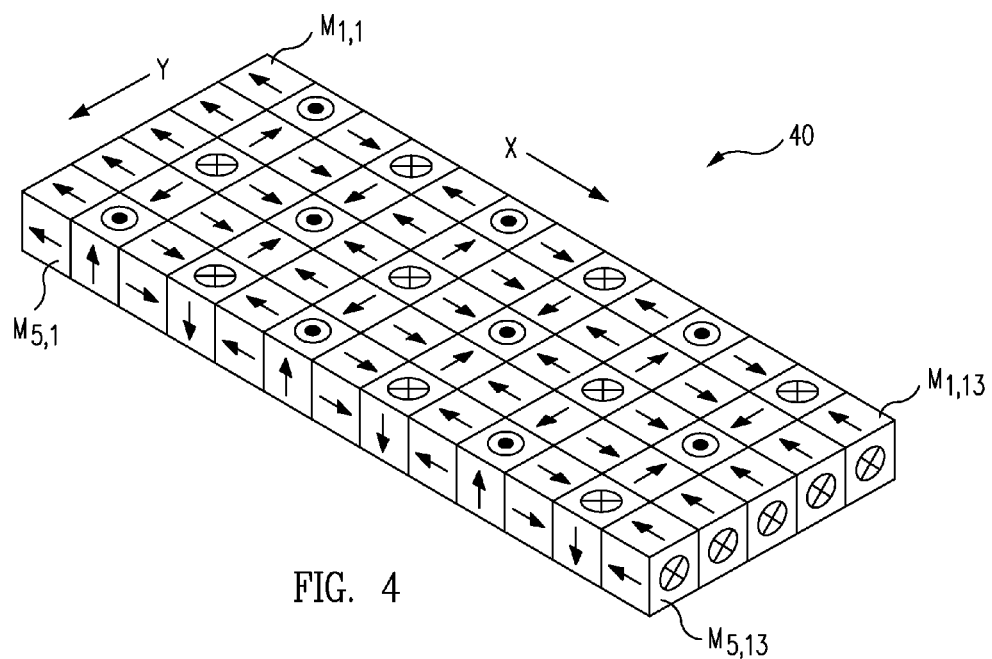
FIG. 4 is a perspective view of another example embodiment of a second order Halbach array in accordance with the present disclosure, referred to herein as a second order "Hyper Halbach" array.

In particular, FIG. 4 is a perspective view of another example embodiment of a second order Halbach array 40 in accordance with the present disclosure, referred to herein as a "Hyper Halbach" array. In the example 5×13 second order Hyper Halbach array 40 of FIG. 4, each of the respective rows (extending in the X direction) of magnets $M_{i,j}$ comprises a conventional first order Halbach array, similar to the Super Halbach array 30 of FIG. 3, whereas, the columns (extending in the Y direction) comprise first order Halbach arrays disposed in alternating fashion with columns in which the fields of the magnets are oriented in the same direction, i.e., that are "in phase" with each other. For example, in the particular 5×13 second order Hyper Halbach array 40 of FIG. 4, the first row of magnets $M_{1,1}$-$M_{13,1}$ comprises a conventional first order Halbach array similar to that of FIG. 1, the first column of magnets $M_{1,1}$-$M_{5,1}$ have magnetic fields that are in phase, i.e., all pointing in the negative X direction, the second column of magnets $M_{1,2}$-$M_{5,2}$ comprises a first order Halbach array, and the third column of magnets $M_{1,3}$-$M_{5,3}$ have magnetic fields all pointing in the positive X direction, and so on, to the last column of the array 40 $M_{1,13}$-$M_{5,13}$. The example Hyper Halbach array 40 of FIG. 4 can be constructed, or "built up" in a manner similar to that of the Super Halbach array 30 of FIG. 3, except that the Hyper Halbach array 40 is built up in the direction of the columns (i.e., in the Y direction), by taking a first or kernel row of magnets $M_{i,j}$ arranged in a first order Halbach array, i.e., row $M_{1,1}$-$M_{1,13}$ in the example of FIG. 3, and then, proceeding in the Y or column direction, repeating that row, but with the magnetic fields of the magnets of succeeding rows rotated counter-clockwise about an axis perpendicular to the Y or column direction through successive 90 degree rotations relative to the immediately preceding row, to the last row $M_{n,1}$-$M_{n,m}$, or in the particular 5×13 embodiment illustrated in FIG. 4, from row $M_{1,1}$-$M_{1,13}$ to row $M_{5,1}$-$M_{5,13}$.

The example 5×13 second order Hyper Halbach array 40 of FIG. 4 exhibits the characteristic one-sided flux of conventional Halbach arrays, as well as a substantially enhanced magnetic field relative to any of the first or second order arrays discussed above and illustrated in FIGS. 1-3. The respective field strengths of the Super and Hyper Halbach arrays 30 and 40 of FIGS. 3 and 4 relative to a single magnet M, a first order array of "alternating" magnets $M_i$ and a first order Halbach array are illustrated in FIGS. 7A-7E. In particular, in FIG. 7A, an ordinary disk magnet 70 is shown being levitated a distance A, where A≈0.65 in., above a single cubic NdFeB magnet 71 that is about ³⁄₁₆ in. on a side. In FIGS. 7B-7E, the same disk magnet 70 is respectively shown being levitated above an array 72 of alternating magnets, a 4×4 Super Halbach array 73, a single order Halbach array 74 and a Hyper Halbach array 75. As may be seen from the figures, the single magnet 71 and the single order Halbach array 74 exhibit about the same field strengths, the alternating and Super Halbach arrays 72 and 73 exhibit relatively weaker field strengths, and the Hyper Halbach array 75 exhibits a field strength that is at least about 1.7 times that of the others.

As discussed above, for any first or second order rectangular matrix arrangement of permanent magnets $M_i$ or $M_{i,j}$ other than an "alternating array," such as the array 20 illustrated in FIG. 2A, in which adjacent magnets $M_{i,j}$ will "stick" together, due to the mutually attractive forces acting between them, and particularly for any of the Halbach arrays discussed herein, in which the respective fields of adjacent magnets $M_{i,j}$ are arranged 90 degrees apart, the opposing forces that act between adjacent magnets will cause them to spin away from each other unless they are constrained in their respective places and orientations within the matrix by a retaining mechanism of some sort.

Figure 5:
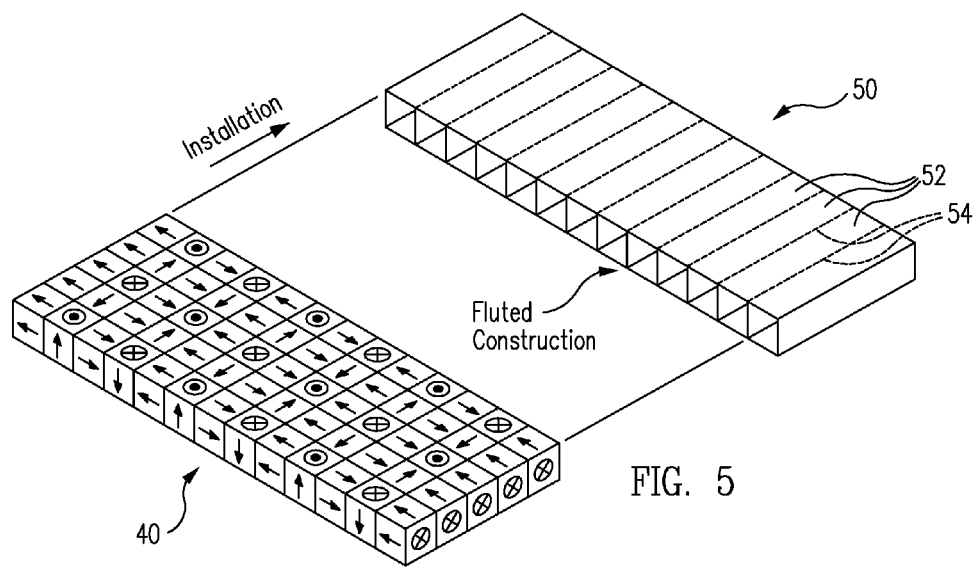
FIG. 5 is a perspective view of the second order Hyper Halbach array of FIG. 4 being installed into a fluted array retainer for retention of the magnets of the array in an integral form.

An example embodiment of such a retaining device, comprising a "fluted core" magnet array retainer 50, is illustrated in FIG. 5. As shown therein, the retainer 50 may comprise a plurality of rectangular "flutes" or tubes 52 made of a non-magnetic material, e.g., an extruded or injection-molded plastic, attached to each other at their sides and sharing common side walls 54. As illustrated in FIG. 5, a second order Hyper Halbach array 40 of the type illustrated in FIG. 4 can be installed into the fluted retainer 50 by inserting the columns of the array 40 into respective ones of the flutes 52 and then held there by sealing the opposite ends of the flutes 52 with, e.g., an adhesive or an adhesive tape (not illustrated).

In a test embodiment of the example retainer 50 illustrated in FIG. 5, a second order Hyper Halbach array 40 was installed into a plastic fluted core retainer 50 with flute outside cross-sectional dimensions of 0.25 in. square. The ³⁄₁₆ in. cubic magnets $M_{i,j}$ of the array 40 thus fit relatively loosely into the fluted core retainer 50, as illustrated in FIG. 9A. A more desirable fluted retainer 50 can be constructed of 0.002-0.005 in. wall thickness plastic material so as to further consolidate the arrangement of the magnets $M_{i,j}$, such as in the Hyper Halbach arrangement illustrated in FIG. 9B, and thereby improve the performance of the array 40. As those of skill in the art will appreciate, the installation of the Hyper Halbach array 40 into a fluted core retainer 50 of the type illustrated not only serves to consolidate the array 40 dimensionally, but also serves to improve environmental protection of electric machinery incorporating the arrays that are placed in hostile environments, such as a salt-corrosive ocean environment.

Figure 6:
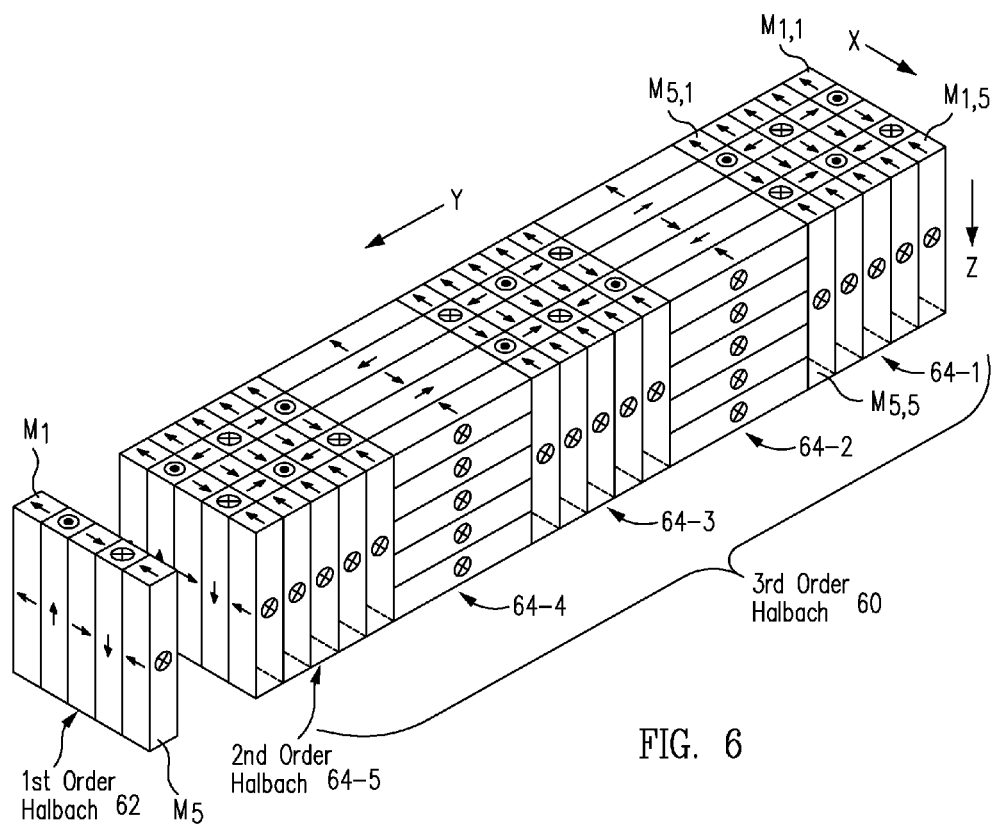
FIG. 6 is an example embodiment of a third order Hyper Halbach array in accordance with the present disclosure.

An example embodiment of a three-dimensional, or "third order" Hyper Halbach array 60 in accordance with the present disclosure is illustrated in the perspective view of FIG. 6. The construction of the third order Hyper Halbach array 60 is similar to that of the second order Hyper Halbach array 40 of FIG. 4, but with the following differences. Unlike the first and second order arrays discussed above, the third order Hyper Halbach array 60 is comprised of elongated "bar" magnets $M_{i,j,k}$ rather than the individual cubic magnets $M_i$ and $M_{i,j}$ discussed above in connection with the first and second order arrays 10, 20A, 20B, 30 and 40 of FIGS. 1-4, respectively. In the particular embodiment illustrated in FIG. 6 the individual magnets $M_{i,j,k}$ are square in cross-section and have a length that is about 5 times their cross-sectional width, which gives the array 60 a significant dimension or extent in a vertical or Z direction that is orthogonal to both the row (X) and column (Y) directions.

As illustrated in FIG. 6, the example third order Halbach array 60 may be constructed, or "built up," in the following manner. First, a conventional first order "kernel" Halbach array 62 $M_1$-$M_5$ is constructed in a manner similar to that discussed above in connection with the conventional Halbach array 10 of FIG. 1. Then, a second order Hyper Halbach "kernel" array 64-1 is constructed in a manner similar to that discussed above in connection with the second order Hyper Halbach array 40 of FIG. 4, i.e., by repeating or reiterating the first order kernel row $M_{1-1}$-$M_{1-5}$ in the Y or column direction, with succeeding rows respectively rotated counter-clockwise about an axis perpendicular to the Y or column direction through successive 90 degree rotations relative to the immediately preceding row, to the last row $M_{n,1}$-$M_{n,m}$, or in the particular embodiment illustrated in FIG. 6, from row $M_{1,1}$-$M_{1,5}$ to row $M_{5,1}$-$M_{5,5}$. This produces a 5×5 second order kernel Halbach array 64-1 containing 25 magnets $M_{1-1}$-$M_{5-5}$. Construction of the third order array 60 then continues with the provision of a second, second order Hyper Halbach array 64-2 adjacent to the first array, the second array 64-2 being identical to the first, second order Hyper Halbach array 64-1 above, except that it is rotated 90 degrees counter-clockwise about an axis perpendicular to the Y or column direction relative to the immediately preceding first, second order Hyper Halbach kernel 64-1. This procedure is then repeated three more times with three additional second order Hyper Halbach arrays 64-3-64-5 to produce the example 5×5×5 third order Hyper Halbach array 60 of FIG. 6, which contains a total of 125 bar magnets $M_{i,j,k}$. As those of skill in the art will appreciate, the Hyper Halbach array 60 illustrated in FIG. 6 is, of course, only by way of example, and third order Hyper Halbach arrays having other numbers of rows, columns and magnets can be constructed using the construction method described above.

The third order Hyper Halbach array 60 should further improve flux density in the air gap of an electromotive device, or could be used by physicists to focus particle beams in permanent magnet "undulators" or "wigglers".

FIGS. 8A-8D are end elevation views respectively illustrating the respective heights, as measured relative to a moving inductor, of the respective magnetic fields produced above a first order array of alternating magnets 81, a conventional first order Halbach array 82, a second order Super Halbach array 83, and a third order Hyper Halbach array 84 of the types discussed herein. As may be seen from the figures, the third order Hyper Halbach array 84 produces by far a greater field strength above the array than any of the other arrays shown.

Figure 10:
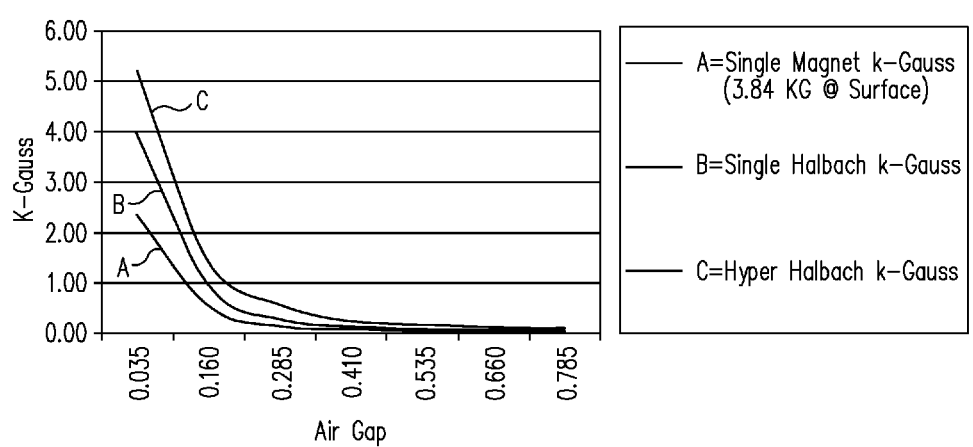

FIG. 10 is a graph illustrating the relative strengths of the respective magnetic fields of a single magnet (curve A), a conventional first order Halbach array (curve B), and a second order Hyper Halbach array (curve C), respectively, in kilogauss (K-Gauss), as a function of the height of an air gap above them. As may be seen from the respective curves, the Hyper Halbach array produces a higher magnetic field than either the single magnet (which produces 3.84 K-Gauss at its upper surface), and the conventional Halbach array, at all air gap heights, or stated alternatively, the Hyper Halbach array enables larger air gaps to be used in electromotive devices, such as motor/generators, for any specified minimum magnetic field strength.

In accordance with the present disclosure, second and third order Super and Hyper Halbach arrays of permanent magnets are provided that can be used to augment permanent-magnet-type electromotive machines, such as motors/generators and other magnetically driven devices, such as particle beam focusers in permanent magnet undulators and wigglers so as to provide simpler, less expensive ways for producing higher flux densities in the air gaps of such devices.

By now, those of skill in this art will appreciate that many modifications, substitutions and variations can be made in and to the materials, apparatus, configurations and methods of the novel Super and Hyper Halbach permanent magnet arrays of the present disclosure without departing from its spirit and scope. Accordingly, the scope of the present disclosure should not be limited to the particular embodiments illustrated and described herein, as they are merely by way of some examples thereof, but rather, should be fully commensurate with that of the claims appended hereafter and their functional equivalents.

What is claimed is:

1. A second order Halbach array of magnets, comprising:
a plurality of magnets fixedly arranged immediately adjacent to each other so as to define a rectangular matrix having rows and columns, wherein
respective magnetic fields of magnets of said plurality of magnets in a first column of the array are disposed 180 degrees out of phase with each other, and
proceeding in a row direction of the array, respective magnetic fields of magnets of said plurality of magnets in each of a second and succeeding columns of the array are respectively rotated counter-clockwise about an axis perpendicular to the row direction of the array through successive 90 degree rotations relative to respective magnetic fields of magnets of said plurality of magnets in an immediately preceding column.

2. The second order Halbach array of claim 1, further comprising means for fixedly retaining the magnets in the matrix.

3. The second order Halbach array of claim 2, wherein the retaining means comprises one of an adhesive and a fluted core retainer.

4. The second order Halbach array of claim 3, wherein the fluted core retainer comprises a molded or an extruded plastic.

5. The second order Halbach array of claim 1, wherein the magnets are at least one of:
identically cubic in shape;
permanent magnets;
rare-earth magnets; and,
neodymium-ferrite-boron (NdFeB) magnets.

6. An electromotive device incorporating the second order Halbach array of claim 1.

7. A second order Halbach array of magnets, comprising:
a plurality of magnets fixedly arranged immediately adjacent to each other so as to define a rectangular matrix having rows and columns, wherein
respective magnetic fields of magnets of said plurality of magnets in a first row of the array are arranged so as to define a first order Halbach array, and
proceeding in a column direction of the array, respective magnetic fields of magnets of said plurality of magnets in each of a second and succeeding rows of the array are respectively rotated counter-clockwise about an axis perpendicular to the column direction of the array through successive 90 degree rotations relative to respective magnetic fields of magnets of said plurality of magnets in an immediately preceding row.

8. The second order Halbach array of claim 7, further comprising means for fixedly retaining the magnets in the matrix.

9. The second order Halbach array of claim 8, wherein the retaining means comprises one of an adhesive and a fluted core retainer.

10. The second order Halbach array of claim 9, wherein the fluted core retainer comprises a molded or an extruded plastic.

11. The second order Halbach array of claim 7, wherein the magnets are at least one of:
identically cubic in shape;
identically elongated and square in cross-section;
permanent magnets;
rare-earth magnets; and,
neodymium-ferrite-boron (NdFeB) magnets.

12. An electromotive device incorporating the second order Halbach array of claim 7.

13. An electric motor/generator incorporating the Halbach array of claim 7.

14. A third order Halbach array of magnets, comprising:
a plurality of second order Halbach arrays of magnets, each comprising:
    a plurality of magnets fixedly arranged immediately adjacent to each other so as to define a rectangular matrix having rows and columns, wherein
    respective magnetic fields of magnets in a first row of the array are arranged so as to define a first order Halbach array, and
    proceeding in a column direction of the second order Halbach array, respective magnetic fields of magnets of said plurality of magnets in each of a second and succeeding rows of the array are respectively rotated counter-clockwise about an axis perpendicular to the column direction of the array through successive 90 degree rotations relative to respective magnetic fields of magnets of said plurality of magnets in an immediately preceding row, wherein
each of the magnets is identically elongated and square in cross section, and
proceeding in a column direction of the third order array, each of a second and succeeding rows of the second order Halbach arrays are rotated counter-clockwise about an axis perpendicular to the column direction of the third order array through successive 90 degree rotations relative to an immediately preceding second order Halbach array.

15. The third order Halbach array of claim 14, further comprising means for fixedly retaining the magnets in the matrix.

16. The third order Halbach array of claim 15, wherein the retaining means comprises one of an adhesive and fluted core retainers.

17. The third order Halbach array of claim 16, wherein the fluted core retainers comprise a molded or an extruded plastic.

18. The third order Halbach array of claim 14, wherein the magnets comprise at least one of:
    permanent magnets;
    rare-earth magnets; and,
    neodymium-ferrite-boron (NdFeB) magnets.

19. An electromotive device incorporating the third order Halbach array of claim 14.

20. An electric motor/generator incorporating the third order Halbach array of claim 14.

* * * * *